(12) United States Patent
Finkemeier et al.

(10) Patent No.: US 9,117,245 B1
(45) Date of Patent: *Aug. 25, 2015

(54) SYSTEMS AND METHODS TO PERFORM CREDIT VALUATION ADJUSTMENT ANALYSES

(71) Applicant: Goldman, Sachs & Co., New York, NY (US)

(72) Inventors: Markus Finkemeier, New York, NY (US); Yongshan Huang, New York, NY (US); Arun Palakurthy, New York, NY (US); Philippe Khuong-huu, New York, NY (US); Michael Stanley, New York, NY (US); Michael Fisher, New York, NY (US); Andrew Hudis, New York, NY (US); Jonathan Loflin, New York, NY (US)

(73) Assignee: Goldman, Sachs & Co., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/081,153

(22) Filed: Nov. 15, 2013

Related U.S. Application Data

(63) Continuation of application No. 13/290,221, filed on Nov. 7, 2011, now Pat. No. 8,584,933, which is a continuation of application No. 12/414,209, filed on Mar. 30, 2009, now Pat. No. 8,074,873, which is a continuation of application No. 10/987,800, filed on Nov. 12, 2004, now Pat. No. 7,530,490.

(60) Provisional application No. 60/519,838, filed on Nov. 12, 2003.

(51) Int. Cl.
*G06F 19/00* (2011.01)
*G06Q 40/06* (2012.01)

(52) U.S. Cl.
CPC ..................................... *G06Q 40/06* (2013.01)

(58) Field of Classification Search
CPC .............................. G06Q 40/00; G06Q 40/02
USPC ............ 235/375, 376, 377, 378, 379; 705/35, 705/36 R, 38
See application file for complete search history.

(56) References Cited

U.S. PATENT DOCUMENTS

| | | |
|---|---|---|
| 5,495,412 A | 2/1996 | Thiessen |
| 5,812,988 A | 9/1998 | Sandretto |
| 6,304,858 B1 | 10/2001 | Mosler et al. |
| 6,456,982 B1 | 9/2002 | Pilipovic |
| 6,519,574 B1 | 2/2003 | Wilton et al. |
| 6,647,375 B1 | 11/2003 | Gelman et al. |
| 7,171,385 B1 | 1/2007 | Dembo et al. |
| 7,530,490 B1 | 5/2009 | Finkemeier et al. |
| 8,074,873 B1 | 12/2011 | Finkemeier et al. |
| 8,584,933 B1 * | 11/2013 | Finkemeier et al. .......... 235/379 |
| 2002/0046143 A1 | 4/2002 | Eder |
| 2004/0225538 A1 | 11/2004 | Gelman et al. |
| 2004/0236657 A1 | 11/2004 | Sinha et al. |
| 2006/0253376 A1 | 11/2006 | Seale et al. |

* cited by examiner

*Primary Examiner* — Seung Lee
(74) *Attorney, Agent, or Firm* — Perkins Coie LLP

(57) ABSTRACT

Systems and methods are provided to perform credit valuation adjustment analyses.

15 Claims, 7 Drawing Sheets

FIG. 6

SYSTEMS AND METHODS TO PERFORM CREDIT VALUATION ADJUSTMENT ANALYSES

CROSS-REFERENCE TO RELATED APPLICATION

This application is a continuation of U.S. patent application Ser. No. 13/290,221 entitled "SYSTEMS AND METHODS TO PERFORM CREDIT VALUATION ADJUSTMENT ANALYSES," filed Nov. 7, 2011, now allowed, which is a continuation of U.S. patent application Ser. No. 12/414,209 entitled "SYSTEMS AND METHODS TO PERFORM CREDIT VALUATION ADJUSTMENT ANALYSES," filed Mar. 30, 2009 and issued as U.S. Pat. No. 8,074,873, which is a continuation of U.S. patent application Ser. No. 10/987,800 entitled "SYSTEMS AND METHODS TO PERFORM CREDIT VALUATION ADJUSTMENT ANALYSES", filed Nov. 12, 2004 and issued as U.S. Pat. No. 7,530,490 which claims priority to and benefit of U.S. Provisional Application No. 60/519,838 entitled "Credit Valuation Adjustment (CVA) and filed Nov. 12, 2003, all of which are incorporated herein by reference in their entirety.

FIELD

The present invention relates to credit valuation adjustment techniques. In particular, the present invention relates to systems and methods to perform credit valuation adjustment analyses.

BACKGROUND

Advances in fixed income securities and markets have led to the widespread availability of a number of different types of products. Many investors and institutions (generally referred to herein as "investors") hold a number of different positions in fixed income securities and fixed income derivatives. For example, a typical institutional investor may hold a number of different derivative positions, many of which may be with different counterparties. The availability of new derivative markets and issues has made it easy for investors to invest and diversify.

Unfortunately, however, the wide availability of different issues and markets can also make it difficult for investors to assess the overall value and potential risk due to counterparty specific credit risk associated with their derivative portfolio. Further, it is also difficult to assess the impact associated with adding a new position to an existing portfolio. A technique referred to as "credit valuation adjustment" has been used to assist investors in evaluating the value and risk associated with their portfolios. However, these credit valuation adjustments are generally performed using proprietary data and proprietary techniques. It would be desirable to provide a credit valuation adjustment tool which utilizes market data and which results in repeatable analyses, thereby allowing investors to reliably assess the overall value and risk of existing and proposed investments and derivative positions.

BRIEF DESCRIPTION OF THE DRAWINGS

FIGS. 4-7 illustrate user displays according to some embodiments.

DETAILED DESCRIPTION

Figure 1:
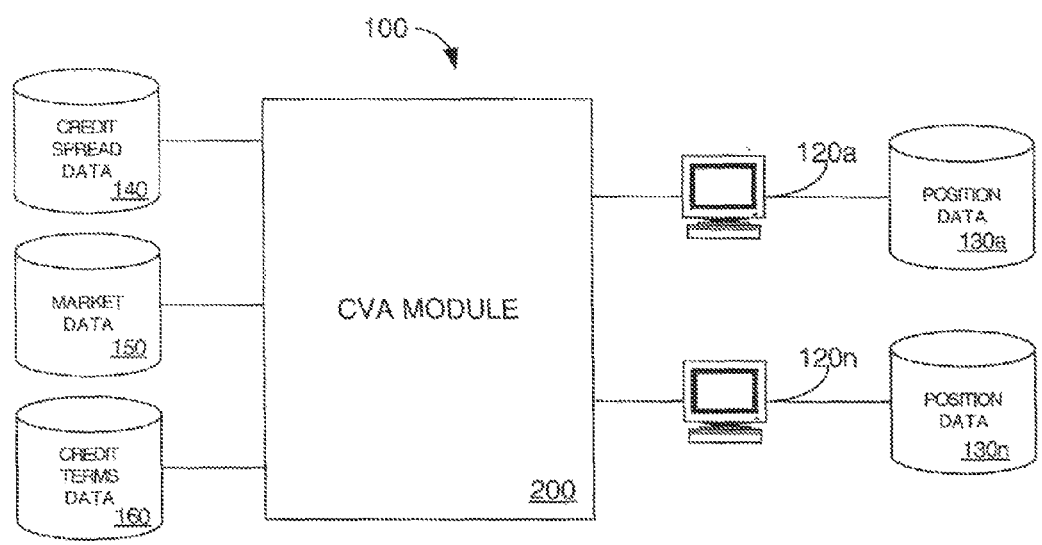
FIG. 1 is a block diagram overview of a credit valuation adjustment system according to some embodiments.

Embodiments of the present invention are directed to systems and methods to facilitate credit valuation adjustment analyses. Pursuant to some embodiments, credit valuation adjustment analyses are performed based on existing derivative positions as well as proposed new derivative positions to identify the overall impact of the new position. In some embodiments, the analyses are performed using a tool that is accessible via a network interface based on available market information and based on information entered by an investor. In some embodiments, the market information is publicly available market information, thereby ensuring that analyses performed using embodiments of the present invention are readily repeatable and may be relied upon and verified by third parties. In some embodiments, the analyses include an assessment of both an asset credit valuation adjustment and a liability credit valuation adjustment to identify an overall credit valuation adjustment associated with a portfolio. In some embodiments, the tool is hosted as an Internet Web service, allowing a wide variety of investors to access and utilize the tool.

A number of terms are used herein. As used herein, for simplicity, the term "fixed income instrument" is used interchangeably with the term "derivative instrument" and generally refers to a financial instrument involving two counterparties where each counterparty has financial obligations to the other. The value of the financial instrument derives its value from the value of some underlying financial instrument or variable (e.g., such as the value of a stock or debt instrument).

For example, the terms "position", "deal" or "holding" are generally used to refer to individual investments associated with an investor. Any of a number of different types of "positions" may be assessed using embodiments of the present invention. For example, any derivative instrument which involves an investor and a counterparty may be assessed, including bonds, loans, or the like. As used herein, the terms "existing portfolio" or "existing position" are generally used to refer to an investor's current fixed income derivative positions or holdings to be analyzed using embodiments of the present invention. As used herein, the terms "proposed trade" or "proposed portfolio" are generally used to refer to new fixed income security positions or holdings to be evaluated by the investor for addition to an existing portfolio.

As used herein, the term "credit default swap" (CDS) is generally used to refer to the spread between the swap rate and risky (or non-Treasury) securities having a similar maturity. For example, a CDS for a 30-year corporate bond is the difference in yield between the bond and a comparable 30-year Swap Rate. Credit spreads change with fluctuations in interest rates and based on other events, such as rating changes, etc. In general, the greater the risk associated with a security, the higher the credit spread.

Embodiments of the present invention will now be described by reference to FIG. 1, where a system diagram is shown.

System Overview

FIG. 1 is a block diagram overview including a credit valuation adjustment system 100 that facilitates the analysis of existing and proposed portfolios. As shown, system 100 includes a credit valuation adjustment ("CVA") module 290 in communication with one or more user devices 120a-n. In some embodiments, each user device 120 is operated by, or on behalf of, an investor (such as an institution, broker-dealer, investment manager, or other qualified investor having a fixed income position or desiring to acquire a fixed income position).

Each user device 120 may be in communication with, store, or otherwise have access to position data 130 associated with one or more existing positions or holdings to be analyzed using system 100. For example, each user may input or otherwise access information related to current derivative positions as well as counterparty specific collateral arrangements associated with those current derivative positions. Further, each user may input or otherwise access new positions or changes to collateral arrangements and/or credit terms. In some embodiments, both existing and new derivative positions are stored as position data 130. In some embodiments, position data 130 also includes counterparty specific credit terms, including, for example: ratings dependent collateral schedules, optional early terminations, time based breaks, trade breaks, ratings based trade breaks, upfront margin, etc. In some embodiments, portions of this data may be retrieved from another source or datastore, such as credit terms data 160 described further below.

For example, a user device 120a operated by or on behalf of an investor is associated with position data 130a identifying positions held by that investor. In some embodiments, individual user devices 120 may share position data. In some embodiments, some or all of the position data 130 associated with an investor may be stored at, or otherwise accessible to, CVA module 200.

CVA module 200 is also in communication with, stores, or otherwise has access to credit spread data 140, market data 150, and credit terms data 160. As discussed above, credit terms data 160, in some embodiments, may be provided to store information associated with existing derivative positions and collateral. In some embodiments, all of this data is retrieved from position data 130 and no separate credit terms data 160 is provided. Some or all of the information may be retrieved from publicly available data sources. Some or all of the information may be keyed in, entered, uploaded or otherwise provided by a user operating user device 120.

Market data 150 may include, for example, swap rates, foreign exchange rates, foreign exchange volumes, foreign exchange correlation data, etc. Market data 150 may also include data for a number of different currencies (and, where relevant, such as for swap rates, a number of different tenors). In some embodiments, market data 150 is retrieved from publicly available data sources such as Bloomberg or the like. In general, the use of publicly-available or market data helps to ensure that CVA analyses performed using embodiments of the present invention are independently repeatable.

Credit spread data 140 may include, for example, CDS curves, specifying CDS levels for various tenors as well as override or counterparty marks for each tenor. Data identifying an associated pricing curve (generally equivalent to the sum of the sector mark and override or counterparty mark for each tenor) may also be retrieved or calculated. In some embodiments credit spread data 140 may be entered or submitted by a user operating a user device 120 (e.g., via one of the illustrative user interfaces shown below in conjunction with FIGS. 4-7). In some embodiments, credit spread data 140 may be retrieved from sources such as other market participants or other public sources of information.

Credit terms data 160 may include, for example, information defining particular derivative positions. For example, for a general currency swap, credit terms data 160 may include information such as a deal identifier, a net unit, a net present value, an effective data, a maturity data, and pays and receives data (such as the currency, the notational value, tenor, coupon and spread, cap and floor, etc.). In some embodiments, credit terms data 160 is entered or submitted by a user operating user device 120 (e.g., via one of the illustrative user interfaces shown below in conjunction with FIGS. 4-7). For example, in some embodiments, credit terms data 160 may be the same as, or based on, the position data 130 input or otherwise provided by users. In some embodiments, credit terms data 160 may be retrieved based on information provided by a user. For example, a user may specify a particular new position it wishes to analyze and CVA module 200 may then act to retrieve credit terms data 160 for the new position.

In general, credit terms data 160 (and position data retrieved from a user from data store 130) for any given position includes sufficient information regarding a credit position to allow the generation of cash flow estimates for the position (in conjunction with other data, such as market and spread data). Different credit positions may require different types of data (e.g., a cancelable swap such as a so-called "Bermudan" cancelable swap may include additional information not typically required by other credit positions, such as information identifying a first call date and other call data; a "swaptions" may include information identifying a first call date as well as a first premium, etc.). Further information about the data used by CVA module 200 will be provided below.

In some embodiments, communication between CVA module 200 and other devices of FIG. 1 is over one or more network interfaces. For example, in some embodiments, CVA module 200 communicates with datastores 140, 150, 160 and user devices 120 using a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network (e.g., in accordance with an 802.11 standard), and/or an Internet Protocol (IP) network such as the Internet, an intranet, or an extranet.

CVA module 200 and any or all of the user devices 120a-n may comprise computers, such as those based on the Intel® Pentium® processor. Any or all of the devices may be, e.g., conventional personal computers, portable types of computers, such as a laptop computer, a palm-top computer, a handheld computer, or a Personal Digital Assistant (PDA). Any or all of the devices may further comprise or include other communication devices, such as, for example, wired or wireless telephones, etc.

In some embodiments, CVA module 200 is configured to operate as a Web server, receiving and sending information to other devices through a network such as the Internet. Users operating user devices 102a-n may interact with CVA module 200 via the Internet to, for example, enter or upload position data and interact with CVA module 200 to perform CVA assessments of the position data and of desired trades or positions. For example, some or all of the communication between user devices 102a-n and CVA module 200 may be conducted through an interface provided by the CVA module 200. The interface may, in some embodiments, be a Web page viewable using an Internet browser (e.g., such as Microsoft's Internet Explorer® or the like). Details of some exemplary user interfaces will be provided further below in conjunction with FIGS. 4-7, although those skilled in the art will appreciate that other configurations and displays may also be utilized.

In some embodiments, for example, a user operating a user device 120 might enter existing and/or proposed position data using a Personal Computer (PC) keyboard. The input, position data could then be transmitted to CVA module 200 via an electronic mail message or a Web site interface. According to some embodiments, position data is uploaded or transferred to CVA module 200 from another application, such as from a Microsoft® Excel® spreadsheet application, or other data file. For example, an investor operating user device 120 may maintain a spreadsheet or database of information associated with its existing positions and may upload or transfer the information to CVA module 200 in order to perform analyses on the information. The investor may also maintain a spreadsheet or database of information associated with a proposed position or positions and may upload or transfer the information in a similar manner to CVA module 200. Alternatively, or in addition, the investor may simply enter some or all of the data using a keyboard.

CVA module 200 may provide data back to the user device 120 in a similar manner (e.g., output information may be provided in a spreadsheet or data file and transmitted to the user device for subsequent analysis and/or may be presented via a user interface associated with the user device). Although a single CVA module 200 is shown in FIG. 1, any number of modules 200 may be included according to some embodiments. Similarly, any number of other devices or components described herein (e.g., user devices or data sources) may be included.

CVA Module

Figure 2:
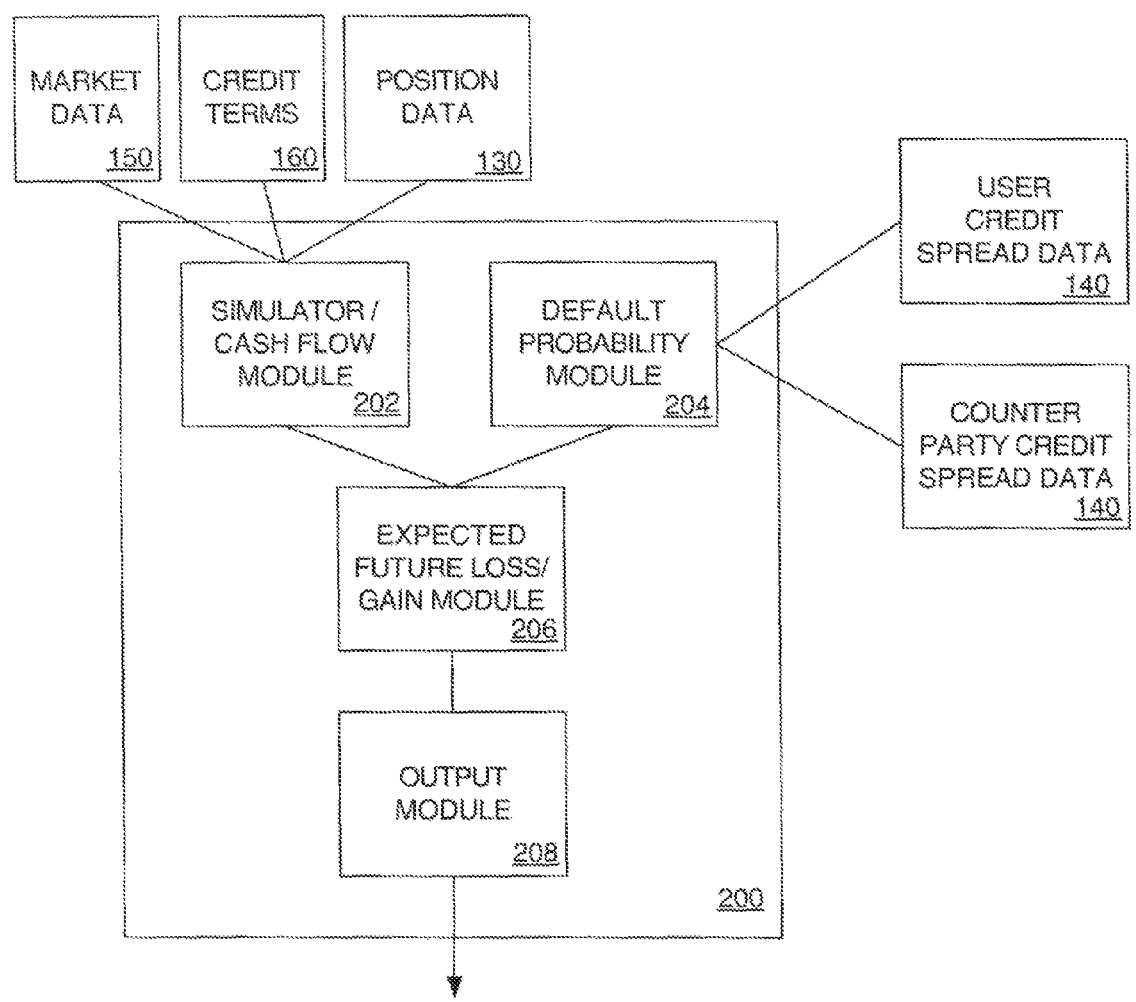
FIG. 2 is a block diagram overview of a credit valuation adjustment module usable in the system of FIG. 1.

Reference is now made to FIG. 2, where a more detailed block diagram view of CVA module 200 is shown. As shown, in some embodiments, CVA module 200 includes a simulator/cash flow module 202 coupled to receive input data including market data 150, credit terms 160 and position data 130. This information is manipulated by simulator/cash flow module 202 to generate a series of cash flows for each of the input positions. In some embodiments, module 202 is a Monte Carlo simulator that uses the input market data and credit terms to create estimated cash flows for each month (or other period) for each position. For example, if a user submits information involving a portfolio of ten credit positions, module 202 will generate a series of cash flows for each of those ten credit positions.

In some embodiments, a Monte carlo simulation is performed using the current foreign exchange rates and current interest rate curves to project what these markets will look like in the future, based on both the projected forward rates as well as market implied volatilities. In some embodiments, the Monte carlo simulation may also include market correlations to determine future market states. In addition in some embodiments, the simulation may also include projecting the credit ratings of both of the counterparties using a credit transition matrix. Once these future market states are projected and exposures are calculated, the Monte carlo simulation values the derivative portfolio to determine different levels of exposure. The values of these exposures are independent of CDS levels, but are dependent on credit terms (such as the collateral schedules). The series of cash flows output from the Monte carlo simulator are based on these calculations. Those skilled in the art will recognize that various types of Monte carlo simulations may be provided so long as both projected forward rates and market implied volatilities are considered.

CVA module 202 also includes a default probability module 204 coupled to receive input data including user credit spread data (e.g., from database 140) and counterparty credit spread data (e.g., from database 140). Default probability module 204 operates on the spread data to create default probability estimates associated with each position. If, for example, a user submits information involving a portfolio of ten credit positions, module 204 will generate default probability estimates for each of the ten positions.

The default probability estimates generated by module 204 and the series of cash flows generated by module 202 are used by module 206 to generate an overall expected future loss or gain for the set of positions. In some embodiments, two different expected future losses or gains are generated: (1) an asset-based number (which represents a net present value of expected future losses from the user's counterparties defaulting on the user); and (2) a liability-based number (which represents a net present value of expected future gains from the user defaulting to its counterparties).

In embodiments where these two different numbers are calculated, the two numbers are summed together to generate a total CVA number for the portfolio (that is, the net present value of expected future credit gains and losses associated with the portfolio). This data is presented to an output module 208 for output (e.g., for display to the user operating user device 120). Output module 208 may operate to format the data in any of a number of different ways. For example, a user may elect to view the output data graphically, numerically or combinations of both. In this manner, a user can enter information about existing and proposed positions, quickly perform CVA analyses, and receive output information.

CVA Analysis Method

Figure 3:
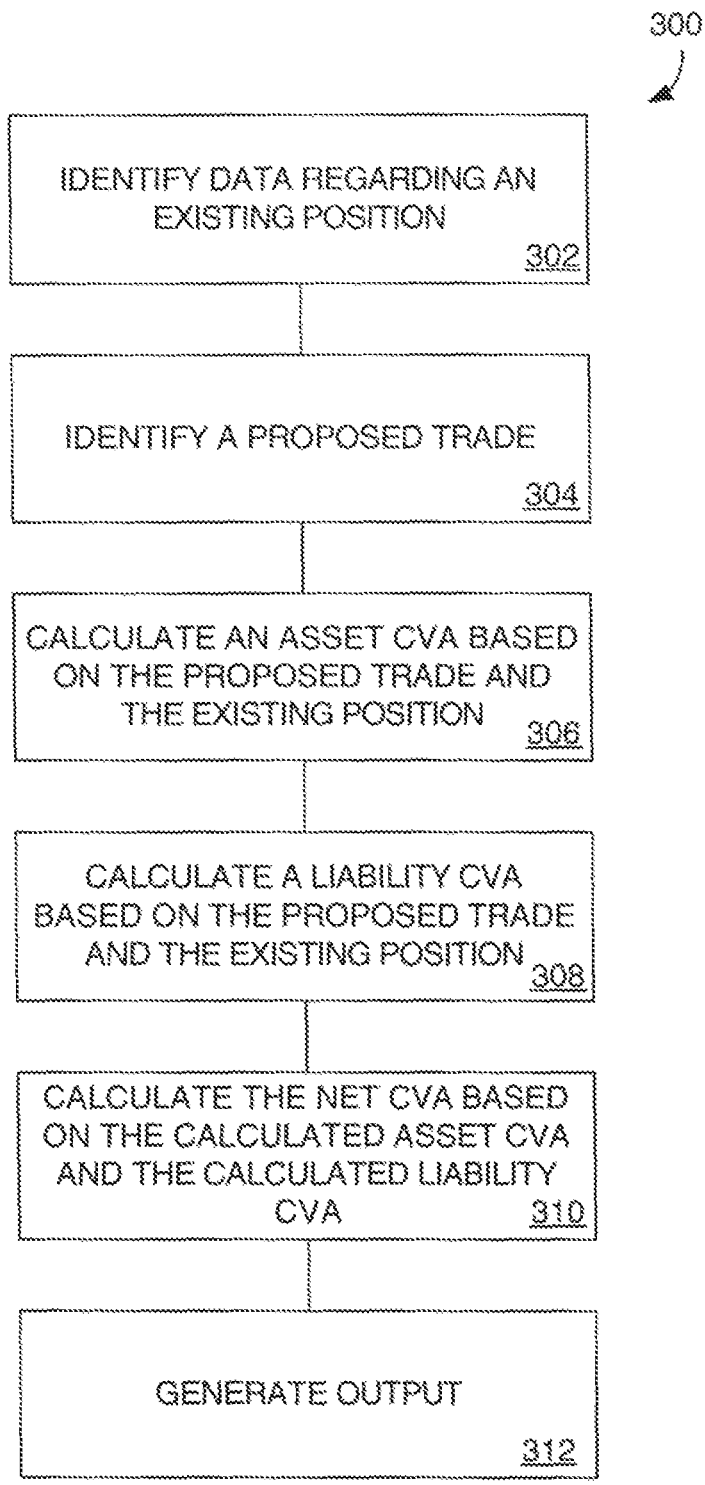
FIG. 3 is a flow chart of a method according to some embodiments.

FIG. 3 is a flow chart of a method 300 according to some embodiments of the present invention. The flow charts described herein do not imply a fixed order to the steps, and embodiments of the present invention may be practiced in any order that is practicable. The method may be performed, for example, by the system 100 shown in FIG. 1. Method 300 is a method that may be performed by, for example, an investor who holds one or more existing credit positions and wishes to evaluate the impact of adding one or more new credit positions to its portfolio. Those skilled in the art will appreciate that embodiments may also be used to evaluate either an existing position or a proposed new position.

Pursuant to some embodiments (e.g., where an investor holds an existing credit position), method 300 begins at 302 where the system is operated to identify data regarding the existing position. For example, a user may provide this information after logging in or otherwise initiating communications with CVA module 200. In some embodiments, this information is provided by uploading or transferring a data file including position details from user device 120 to CVA module 200 over a network connection. In some embodiments, a user operating user device 120 keys in the information through a user interface presented by CVA module 200 (e.g., see the user interfaces of FIGS. 4-7 described below). In general, the information provided at 302 includes sufficient detail regarding an investor's credit positions to allow CVA module 200 to retrieve relevant market data and credit data to generate cash flows and default probabilities for each of the credit positions in the existing portfolio.

Method 300 continues at 304 where information identifying a proposed trade is provided. As with the information provided at 302, this information may be keyed in, uploaded, or otherwise transferred from a user device 120 to CVA module 200. In some embodiments, this information is provided by uploading or transferring a data file including position details from user device 120 to CVA module 200 over a network connection. In some embodiments, a user operating user device 120 keys in the information through a user interface presented by CVA module 200 (e.g., see the user interfaces of FIGS. 4-7 described below). In general, the information provided at 304 includes sufficient detail regarding an investor's proposed new credit positions to allow CVA module 200 to retrieve relevant market data and credit data to generate cash flows and default probabilities for each of the proposed trades.

Method 300 continues at 306 where the system operates to calculate an asset CVA based on the proposed trade and the existing position. For example, this calculation includes retrieving the relevant market and spread data needed to generate a series of cash flows and default probabilities for each of the existing credit positions and for each of the proposed trades, and then calculating the net present value of expected future losses which would result if each of the user's counterparties defaulted on their credit obligations.

Method 300 continues at 308 where the system operates to calculate a liability CVA based on the proposed trade and the existing position. For example, this calculation includes retrieving any relevant market and spread data needed to generate a series of cash flows and default probabilities for each of the existing credit positions and for each of the proposed trades, and then calculating the net present value of expected future losses which would result if the user defaulted to it's counterparties on each of the credit obligations.

Method 300 continues at 310 where the system operates to calculate the net CVA based on the calculated asset CVA and the calculated liability CVA. Once the system has calculated an asset and a liability CVA based on the existing position and the proposed trade, the system sums the two to arrive at a net CVA representing the net present value of the overall portfolios expected future credit losses and gains.

Method 300 continues at 312 where the system operates to generate output. For example, processing at 312 may include receiving instructions from a user operating user device 120 to select one or more output options. Output options could include the display (on a display device associated with user device 120, for example) of numerical output, graphical output, or other output communicating the calculated net, asset and liability CVA based on the input information. Other output options could include the download or transmission of data files including detailed information associated with the calculated net, asset and liability CVAs. In some embodiments, further processing may include allowing the user to initiate the execution of a trade based on the proposed position (e.g., if the analysis shows that the addition of the proposed position to the existing portfolio has a desirable effect on the net CVA, the user may elect to add the proposed position to the existing portfolio).

User Display

Figure 4:
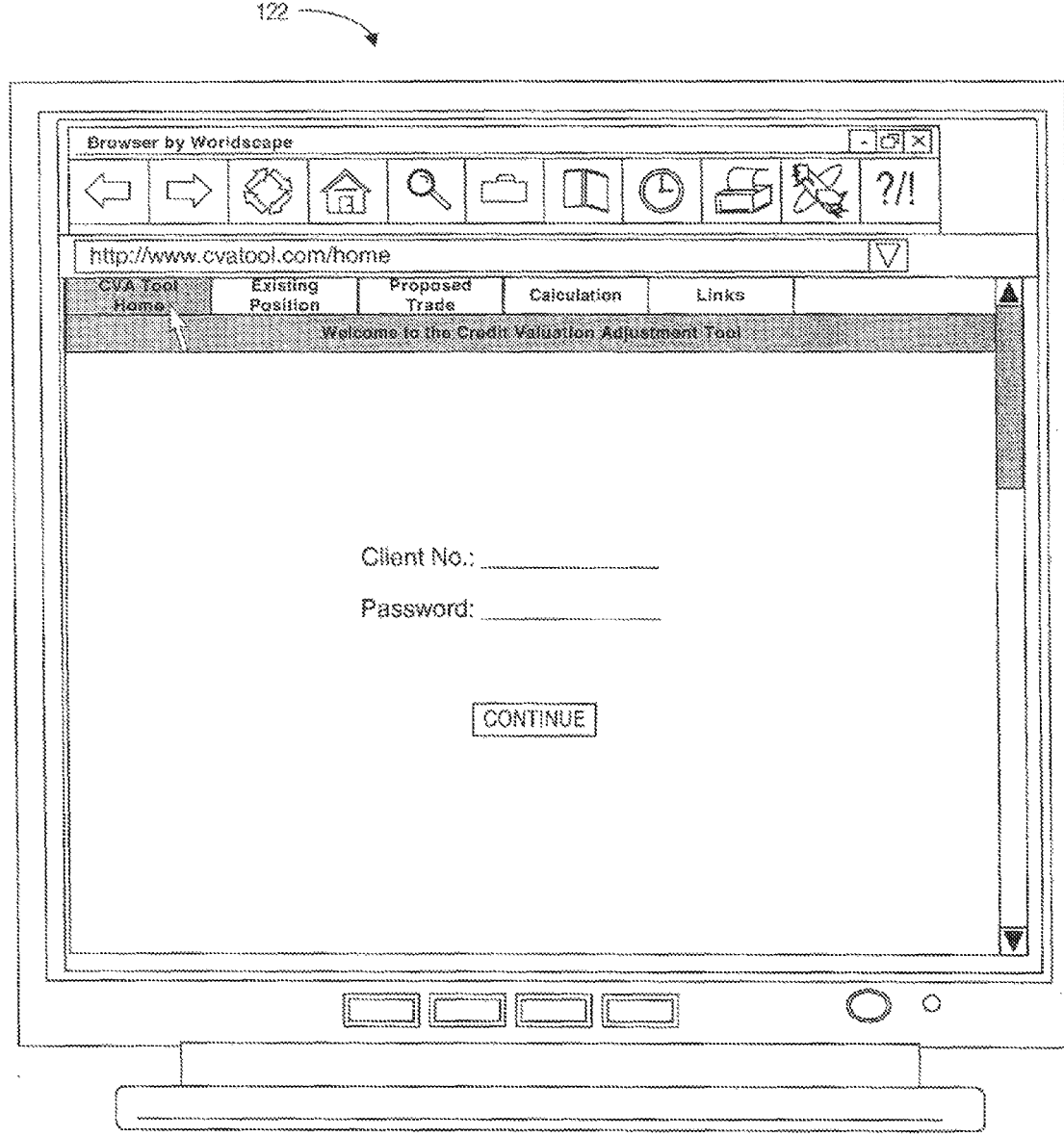

FIG. 4 illustrates a user display 122 that may be accessed by, for example, a trader, a risk manager, or other user desiring to perform CVA analyses. In particular, the user display 122 is displayed to a user operating a user device 120 as shown in FIG. 1. In general, users operating user devices 120 may be presented with a series of user interfaces allowing them to efficiently and accurately interact with CVA module 200. FIG. 4 depicts a first user interface that may be displayed on a display 122 associated with a user device 120. In some embodiments, the user interface is viewed by a user by directing an Internet browser to a Web site operated by, or on behalf of, CVA module 200. In the example depicted in FIG. 4, CVA module 200 is associated with a Web server having a URL of "www.cvatool.com".

A user, who points his browser to this URL is presented, in one example embodiment, with a "home page" or entry screen 122 allowing the user to log in or provide other identifying information in order to gain access the CVA module to perform CVA analyses. Pursuant to some embodiments, data security and privacy measures are provided which ensure that position and other data provided by each user is maintained secret and secure. In the example user interface shown, the Web site includes several different pages associated with the CVA module 200 (including the illustrated home page, a page for existing position data, a page for proposed trade data, a calculation page, a links page, etc.). Those skilled in the art will appreciate that other pages and information may also be associated with the Web site.

Figure 5:
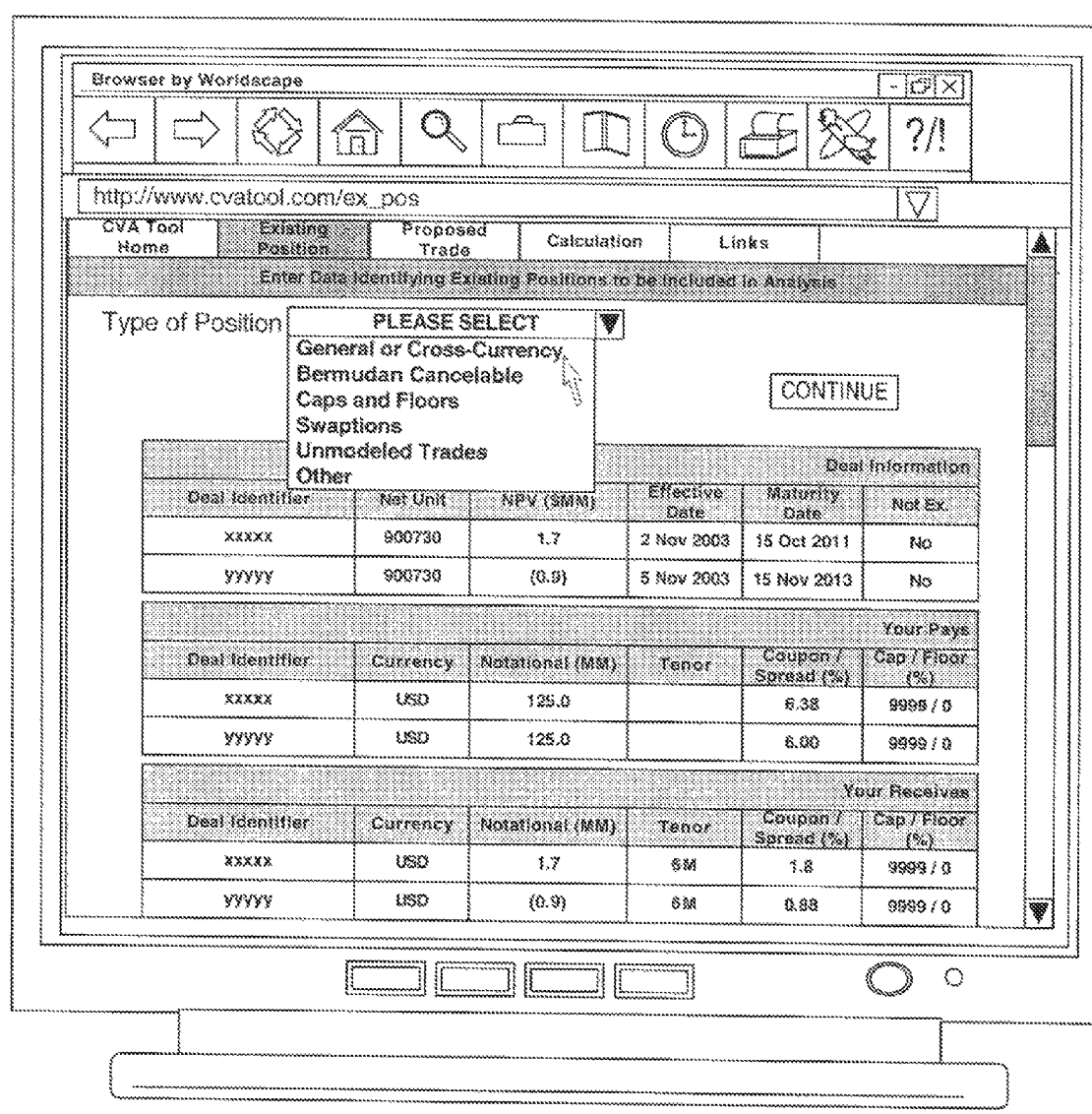

FIG. 5 illustrates a further user display 122 showing an example of a screen that is displayed to a user who has successfully gained access to the Web site (e.g., by providing an authorized user identifier and password) and who has selected to provide information regarding an existing credit position. In the illustrative example shown, the user is presented with an interface that prompts the user to enter data identifying existing positions to be included in a CVA analysis. As shown, a drop down box is provided which allows the user to select a type of credit position to be entered. The user has selected to enter data identifying two "general or cross-currency" swaps. Pursuant to some embodiments, the Web server is structured to present the user with customized data entry screens based on the type of credit position selected. As shown, the selection of a "general or cross-currency" swap causes the presentation of three types of data entry tables: a deal information table, a table for the user's pays information, and a table for the user's receives information.

As shown, the user has entered information about two positions (identified as deals "xxxx" and "yyyy"). Those skilled in the art will appreciate that other types of screens and other types of information may be provided. For example, the user may be prompted to attach or identify a position data file that can be uploaded to CVA module 200 rather than typing in the position data.

Figure 6:
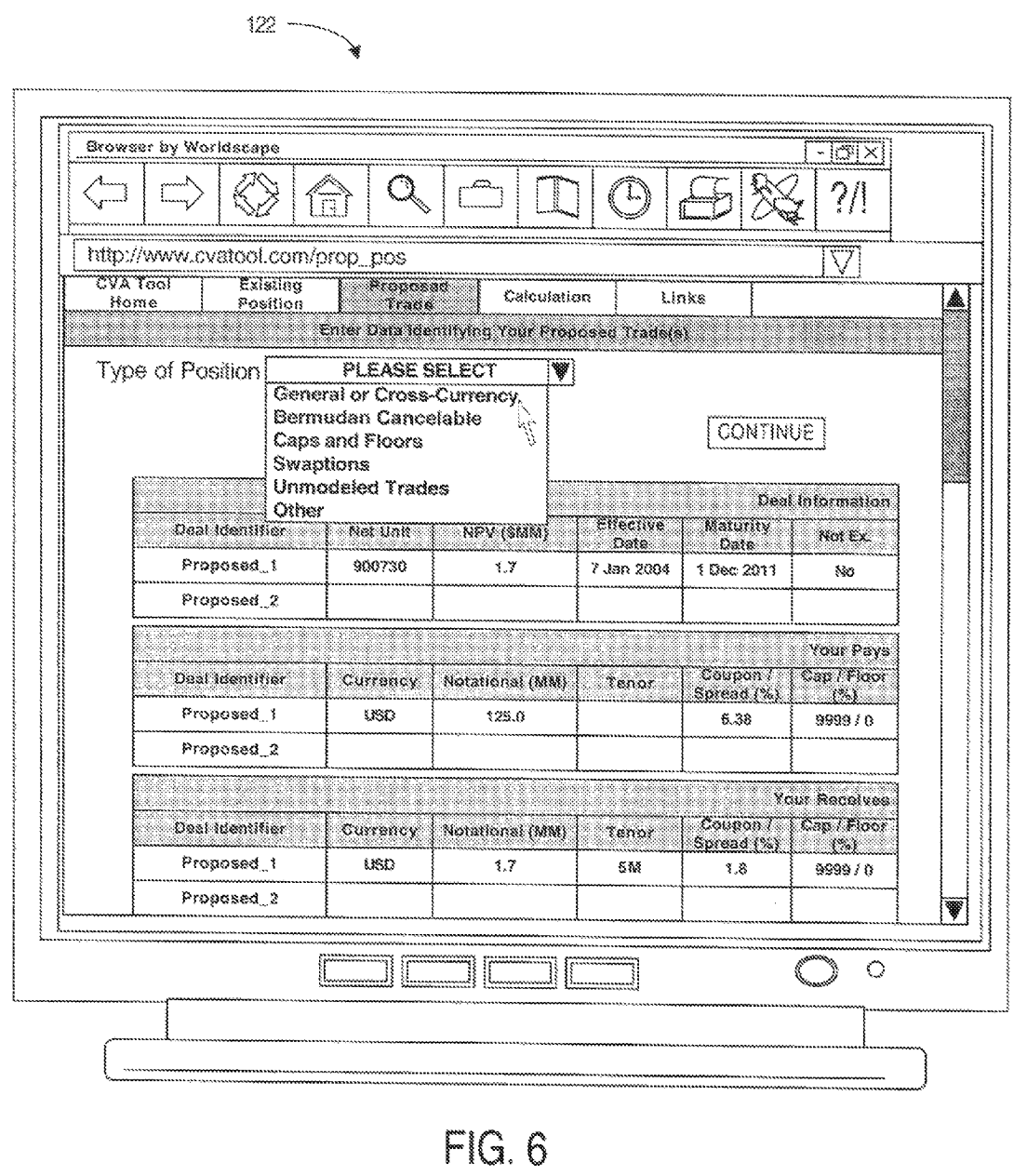

Referring now to FIG. 6, a further user display 122 is shown which represents a screen that may be presented to a user who has selected to enter data identifying a proposed trade or position. As with the screen presented in FIG. 5, the screen of FIG. 6 may include a drop down box that allows the user to select the type of credit position for which data is to be entered. Again, the user has selected to enter data for a "general or cross-currency" swap, and the system has presented the user with three data entry tables for data entry. Those skilled in the art will appreciate that other screens and other types of information may be provided, so long as the user is able to enter, upload, or otherwise specify details associated with a proposed position.

Figure 7:
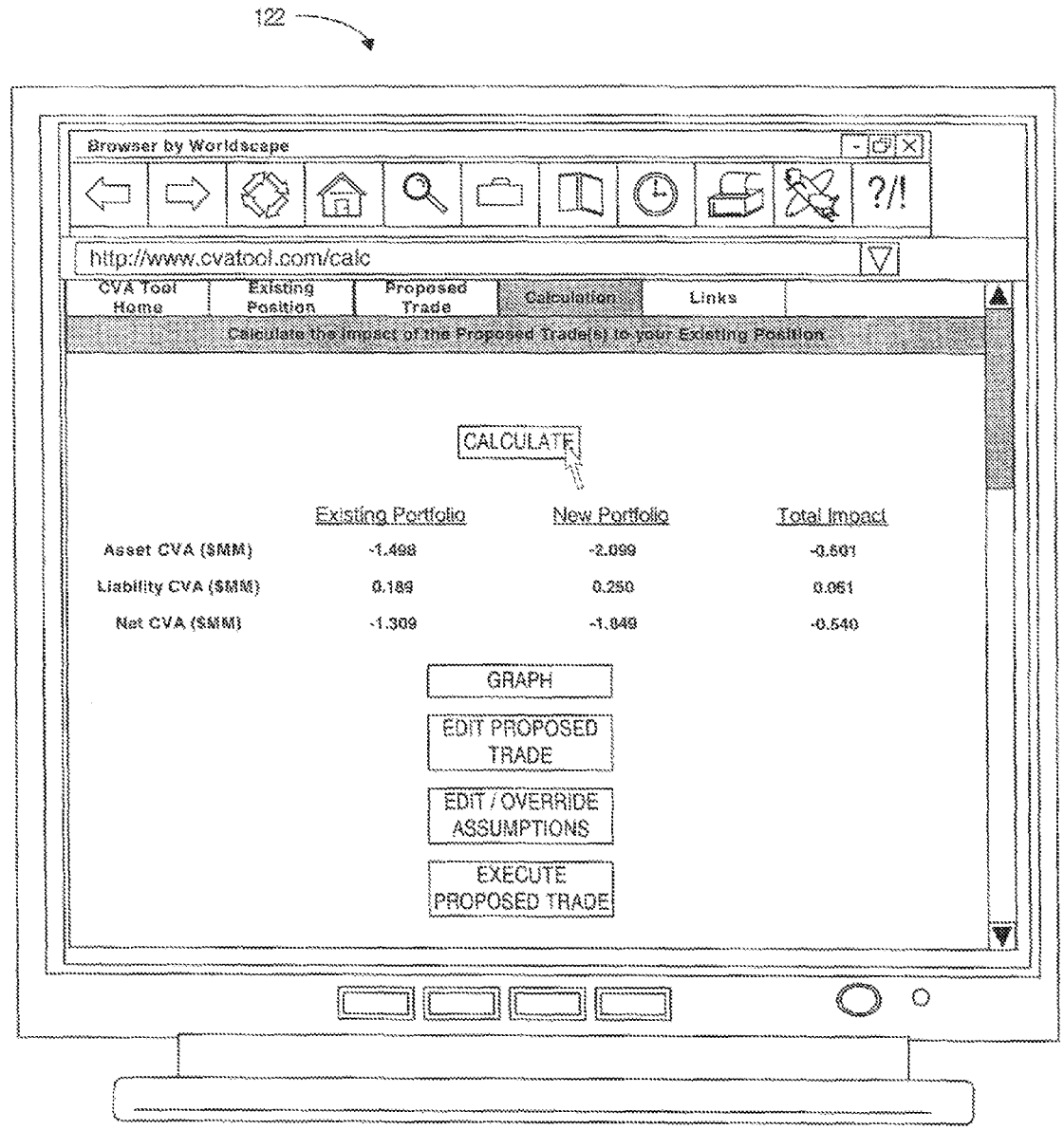

Referring to FIG. 7, a further user display 122 is shown which represents a screen that may be presented to a user who has already entered data identifying its existing credit positions and data identifying its proposed trades. In particular, the user display 122 of FIG. 7 is a calculation screen that allows the user to request the calculation of CVA data based on the position data already entered by the user. In the illustrative screen, selection of the "calculate" icon causes CVA module 200 to perform asset, liability, and net CVA calculations as discussed above. The screen displays the results of the calculations for the existing portfolio, the new (or proposed) portfolio, and the overall impact if the new portfolio is added to the existing portfolio. The user may also select other display options. For example, as illustrated in FIG. 7, the user may elect to view a graphical depiction of the analyses. Further, the user may elect to modify or edit the proposed trade data to analyze the impact of variations in the proposed portfolio. In some embodiments, the user may also be permitted to vary, edit or override one or more of the assumptions associated with the input data.

As shown, in some embodiments, the user may further elect to execute the proposed trade. For example, once the user has identified a proposed trade that has a desirable and impact on the net CVA, the user may initiate the execution of a trade to acquire the proposed position. In some embodiments, this involves the transfer of data regarding the new position from CVA module 200 to a trading platform or system.

ADDITIONAL EMBODIMENTS

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although some embodiments have been described in which the CVA module 200 is run as a Web server as an independent Web site, other embodiments may involve integrating the CVA module with other systems. For example, in some embodiments, CVA module 200 may be hosted by a service provider offering other financial services (e.g., such as a service provider offering market data services, etc.).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A credit valuation adjustment system, comprising:
a computer system comprising one or more processors and instructions that cause the computer system to:
receive information associated with an existing credit position involving a first party and counterparties;
receive information associated with a proposed credit position involving said first party and counterparties;
calculate a first net present value of expected future losses based on a default of each of said counterparties;
calculate a second net present value of expected future gains based on a default of said first party;
sum said first and second net present values to identify a third net present value of an expected future credit loss or gain of an overall credit position including both said existing credit position and said proposed credit position; and
output the identified third net present value.

2. The system of claim 1, wherein the identified third net present value is output for display.

3. The system of claim 1, wherein said computer system includes instructions for:
displaying an input display screen to a user, said input display screen including a section for receiving information identifying a type of said existing credit position.

4. The system of claim 3, wherein said input display screen further includes a section for receiving information identifying terms of said existing credit position, said second section formatted based on said information identifying a type of said existing credit position.

5. The system of claim 1, wherein said computer system includes instructions for:
displaying an input display screen to a user, said input display screen including a section for receiving information identifying a type of said proposed credit position.

6. The system of claim 5, wherein said input display screen further includes a section for receiving information identifying terms of said proposed credit position, said section formatted based on said information identifying a type of said proposed credit position.

7. The system of claim 1, wherein said computer system includes instructions for:
retrieving current market data from a market data source;
performing a monte carlo simulation to generate a series of cash flows associated with each of said existing and proposed credit positions; and
generating predictions of default probabilities associated with each of said existing and proposed credit positions.

8. The system of claim 1, wherein said computer system includes instructions for:
causing at least one of said first, second, and third net present values to be displayed on a display screen operated by a user.

9. A credit valuation adjustment apparatus, comprising:
a computer system comprising one or more processors, and one or more storage devices in communication with said computer system and storing instructions adapted to be executed by said computer system to:
receive information associated with an existing credit position involving a first party and counterparties;
receive information associated with a proposed credit position involving said first party and counterparties;
calculate a first net present value of expected future losses based on a default of each of said counterparties;
calculate a second net present value of expected future gains based on a default of said first party; and
sum said first and second net present values to identify a third net present value of an expected future credit loss or gain of an overall credit position including both said existing credit position and said proposed credit position; and
output the identified third net present value.

10. The system of claim 9, wherein said computer system includes instructions for:
receiving an indication from a user to transfer information associated with the proposed credit position to a trading system, thereby initiating execution of a trade to acquire the proposed credit position.

11. The system of claim 1, wherein said computer system includes instructions for:
receiving an indication from a user to transfer information associated with the proposed credit position to a trading system.

12. The system of claim 9, wherein said computer system includes instructions for:
causing at least one of said first, second, and third net present values to be displayed on a display screen operated by a user.

13. A credit valuation adjustment system, comprising:
a computer system comprising one or more processors and instructions that cause the computer system to:
receive information associated with an existing credit position involving a first party and counterparties;
receive information associated with a proposed credit position involving said first party and counterparties;
calculate a first net present value of expected future losses based on a default of each of said counterparties;

calculate a second net present value of expected future gains based on a default of said first party;

sum said first and second net present values to identify a third net present value of an expected future credit loss or gain of an overall credit position including both said existing credit position and said proposed credit position; and receive an indication from a user to transfer information associated with the proposed credit position to a trading system.

14. The system of claim 13, wherein said computer system includes instructions for:

retrieving current market data from a market data source;

performing a monte carlo simulation to generate a series of cash flows associated with each of said existing and proposed credit positions; and generating predictions of default probabilities associated with each of said existing and proposed credit positions.

15. The system of claim 13, wherein said computer system includes instructions for:

causing at least one of said first, second, and third net present values to be displayed on a display screen operated by the user.

* * * * *